United States Patent [19]

Cripe et al.

[11] Patent Number: 5,273,088
[45] Date of Patent: Dec. 28, 1993

[54] VAPOR REDUCTION SYSTEM FOR SOLVENT BOTTLES

[75] Inventors: Jerry D. Cripe, Tempe; Michael P. Menchio, Mesa, both of Ariz.

[73] Assignee: Motorola, Inc., Schaumburg, Ill.

[21] Appl. No.: 884,444

[22] Filed: May 18, 1992

[51] Int. Cl.⁵ ............................................. B65B 1/04
[52] U.S. Cl. ............................ 141/329; 141/51; 141/65; 15/304
[58] Field of Search ............ 141/51, 65, 83, 311 R, 141/329, 330, 319, 368, 98; 222/148, 86, 397, 87; 15/304

[56] References Cited

U.S. PATENT DOCUMENTS

| | | | |
|---|---|---|---|
| 3,333,735 | 8/1967 | Odasso | 141/330 |
| 4,166,481 | 9/1979 | Farris et al. | 141/1 |
| 4,461,054 | 7/1984 | Oehlenschlager | 15/304 |
| 4,690,180 | 9/1987 | Gold | 141/51 |
| 5,139,057 | 8/1992 | Benedetti | 141/18 |

*Primary Examiner*—Ernest G. Cusick
*Assistant Examiner*—David J. Walczak
*Attorney, Agent, or Firm*—Gary W. Hoshizaki; Joe E. Barbee

[57] ABSTRACT

A vapor reduction system for a solvent bottle (12) which is performed in an enclosure (11). A timer (23) controls events during a purge cycle. A vent (14) removes vapors from the enclosure to a vapor treatment system. Pressurized gas is forced through the solvent bottle (12) which vaporizes solvent liquid. A receptacle (16) receives solvent liquid and vapor forced from solvent bottle (12). A line (17) removes to solvent liquid from the receptacle (16) to an environmentally safe container. A second line (18) removes solvent vapor from the receptacle (16) to the vapor treatment system. A fire extinguishing system (31) senses and extinguishes any fire which may develop.

12 Claims, 1 Drawing Sheet

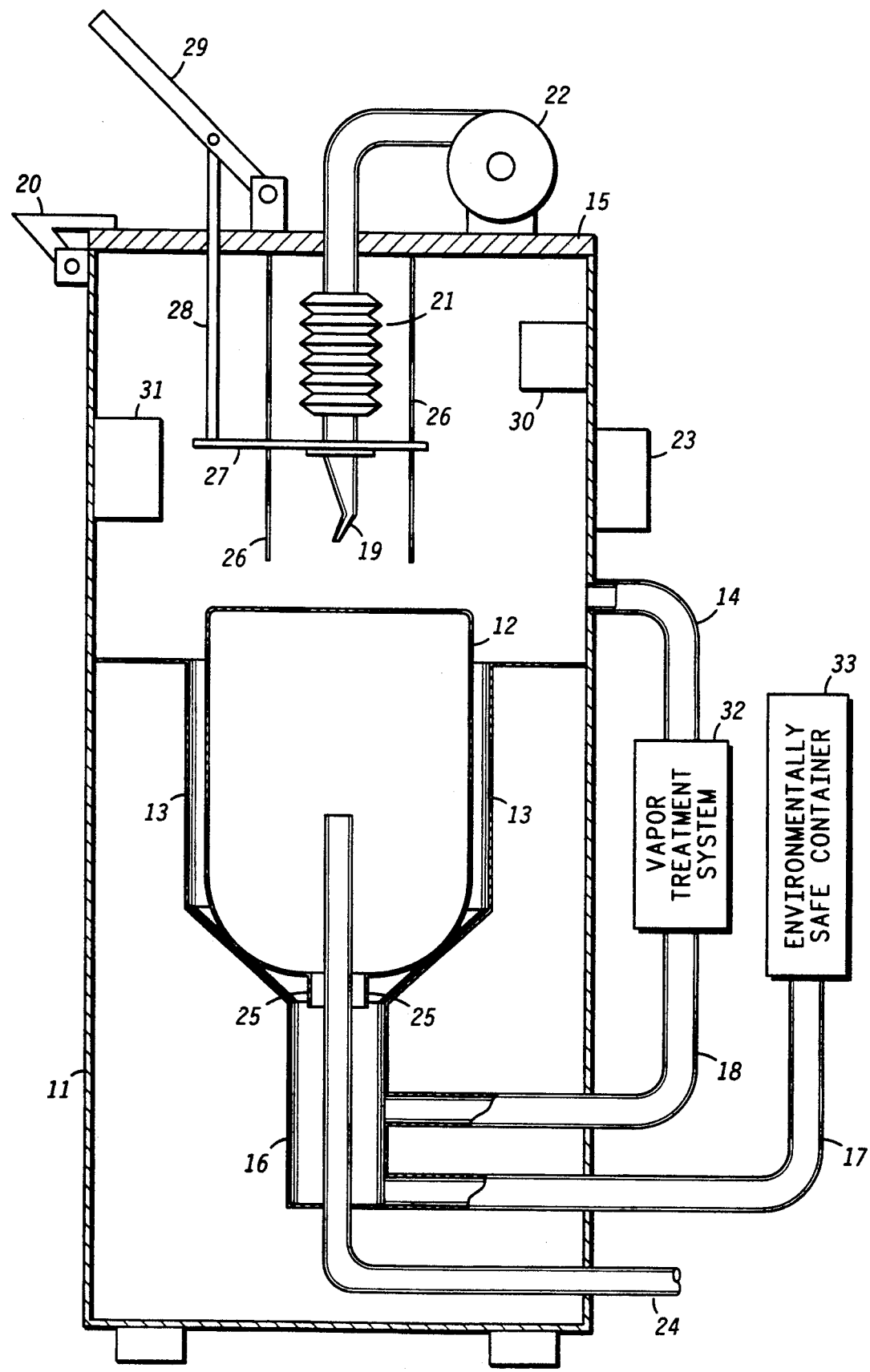

VAPOR REDUCTION SYSTEM FOR SOLVENT BOTTLES

BACKGROUND OF THE INVENTION

This invention relates, in general, to removal of hazardous chemicals, and more particularly to removing the remaining solvent liquid and solvent vapor from a solvent bottle to allow safe transport and disposal of an empty solvent bottle.

Semiconductor chip manufacturers use large quantities of solvents in the process of manufacturing semiconductor devices. For example, a large manufacturer could easily use 30,000 bottles of solvent per month. Each solvent bottle typically has 30 cc of liquid remaining after it has been used or emptied. At the volumes used in this example, the remaining fluid in each bottle would total approximately 900 liters of solvent.

Solvents are classified as hazardous waste and must be disposed of in an appropriate manner. Leaving solvent in each individual used container poses further problems. Not only must the solvent be disposed of, but each container is also considered hazardous material. The problem is further complicated when second or third parties are involved with the transportation and removal of hazardous waste due to environmental regulations.

Requirements for disposing of solvents based on the 1990 Clean Air Act are going into effect. One provision in the Clean Air Act is a technology driven law requiring users of hazardous waste materials to install the best technology available for handling these hazardous waste materials or installing a maximum achievable control technology for hazardous wastes. At this time there are no adequate means for handling solvent waste in the volumes it is currently used, which is cost effective, and meets standards set up by the 1990 Clean Air Act. It would be of great benefit if a system were developed which could purge used solvent bottles of solvent liquid and vapor within regulation guidelines. The system would allow the removal of solvent in much higher volumes and allow the environmentally clean solvent bottles to be disposed of in a normal fashion without being classified as a hazardous material.

SUMMARY OF THE INVENTION

Briefly stated, this invention removes solvent liquid and vapor from a solvent bottle. A solvent bottle is placed in an enclosure. The solvent bottle is supported within the enclosure and a receptacle receives solvent liquid and vapor from a solvent bottle opening. A pressurized gas is forced through the solvent bottle to vaporize any remaining liquid and to remove solvent vapor from the solvent bottle. The receptacle recovers solvent liquids and vapors from the bottle and removes them to an environmentally safe area for safe disposal.

BRIEF DESCRIPTION OF THE DRAWINGS

The single figure is an illustration of a purging system for a solvent bottle in accordance with the present invention.

DETAILED DESCRIPTION OF THE DRAWINGS

The single figure is an illustration of a vapor reduction system for a solvent bottle which removes remaining solvent liquid and vapor and renders the solvent bottle environmentally clean for standard trash disposal or recycling.

A sealed enclosure 11 provides a safe area for purging a used solvent bottle 12 of all remaining solvent liquid and vapor. In the preferred embodiment, a lid 15 forms a top of sealed enclosure 11 which is opened to allow solvent bottle 12 to be placed in a solvent bottle cradle 13 which serves as a means for supporting. When lid 15 is closed, a latch mechanism 20 is used to seal lid 15 to prevent solvent vapor from leaking from sealed enclosure 11.

A vent 14 coupled to sealed enclosure 11 is provided to prevent vapor from escaping to the atmosphere when opening solvent bottle 12 and placing it in sealed enclosure 11. Vent 14 draws in air and solvent vapors when sealed enclosure 11 is open or closed. Vent 14 serves as a means for venting solvent vapors from sealed enclosure 11. Vent 14 couples to a vapor treatment system 32 to treat solvent vapor. The vapor treatment system is external to sealed enclosure 11.

Solvent bottle 12 comes in a variety of configurations. Both plastic and glass bottles are used to store solvent. A distinguishing feature between plastic and glass bottles is a difference in bottle height. The height difference between the glass and plastic solvent bottles is exploited to determine solvent bottle type. This is important because plastic and glass bottles go through different purging procedures. A feature of solvent bottle 12 is a neck 25 to simplify pouring. An opening for releasing liquid solvent is at the end of neck 25 of solvent bottle 12.

Cradle 13 for supporting solvent bottle 12 is built in sealed enclosure 11 and is shaped similarly to a solvent bottle to minimize solvent bottle 12 movement during a purge cycle. Cradle 13 supports solvent bottle 12 in a vertical direction. The opening of solvent bottle 12 is pointed towards a floor of sealed enclosure 11. A receptacle 16 is built integral to the cradle and forms an enclosure around neck 25 of solvent bottle 12 to catch solvent liquid and vapor. A line 17 couples to receptacle 16 to receive any solvent liquid and remove it from sealed enclosure 11 to an environmentally safe container 33 external to sealed enclosure 11. A line 18 couples to receptacle 16 which draws in solvent vapor and removes it from sealed enclosure 11 to the vapor treatment system 32 external to sealed enclosure 11. Receptacle 16 and lines 17 and 18 serve as a means for recovering gas and liquid ,from solvent bottle 12. The vapor treatment system 32 is designed to handle solvent vapors according to government environmental standards. Two common vapor treatment systems are a vapor recovery system and a vapor incineration system, both eliminate solvent vapors from being released to the atmosphere.

A hollow piercing tool 19 is coupled to a flexible hose 21 inside sealed enclosure 11. Flexible hose 21 couples through lid 15 of sealed enclosure 11 to a blower 22. Blower 22 serves as a means for forcing gas through solvent bottle 12. The end of hollow piercing tool 19 is a sharp edge which can pierce through a plastic solvent bottle. Two guide rods 26 are attached to lid 15 inside of sealed enclosure 11 in a vertical direction. Two guide rods 26 are placed on either side of hollow piercing tool 19 and flexible hose 21. Each guide rod 26 acts as a guide for a guide plate 27 which extends hollow piercing tool 19 vertically to touch solvent bottle 12. Guide plate 27 has two holes and mounts horizontally onto hollow piercing tool 19. Each guide rod 26 extends through a hole on guide plate 27. The guide plate and the two rods limit motion of hollow piercing tool 19 to an up or down vertical motion. A rod 28 is fastened to guide plate 27 to produce the up or down motion. Rod 28 passes through lid 15 of sealed enclosure 11 and is pivotally attached to a lever arm 29. Lever arm 29 is pivotally attached to lid 15 of sealed enclosure 11. The level arm is used by an operator of the vapor reduction system to move the hollow piercing tool 19 to touch solvent bottle 12. Two guide rods 26, guide plate 27, rod 28 attached to guide plate 27, and lever arm 29 serve as a means for moving hollow piercing tool 19. The mechanism which controls the movement of hollow piercing tool 19 can be easily automated to perform its task without human intervention.

As mentioned previously, solvent bottle type can be determined by height. The mechanism for moving hollow piercing tool 19 also serves as a means for sensing or differentiating solvent bottle type. The distance needed to move lever arm 29 until touching solvent bottle 12 is used to determine solvent bottle type. An alternative to this would be to use an ultrasonic sensing device 30 which serves as a means for sensing solvent bottle type. Glass and plastic are dissimilar materials which produce different reflections when hit by an ultrasonic wave. The solvent bottle type is determined by the type of reflection from solvent bottle 12 which is received by ultrasonic sensing device 30.

If solvent bottle 12 is plastic, lever arm 29 is pulled down until hollow piercing tool 19 punctures solvent bottle 12. Blower 22 is then enabled and blows air through flexible hose 21 and hollow piercing tool 19 into solvent bottle 12. The air forced into solvent bottle 12 vaporizes solvent liquid which adheres to solvent bottle 12 and is forced into receptacle 16 to be removed by line 17 or line 18. In the preferred embodiment, blower 22 outputs 2.83 cubic meters per minute. This flow rate adequately vaporizes solvent within solvent bottle 12 and flows unrestricted from neck 25 to be captured by receptacle 16 and removed by either line 17 or 18. A study of a large number of solvent bottles yielded a range of 25 cc to 35 cc remaining in a used solvent bottle. A timer 23 controls the length of time blower 22 is left on which determines how much of the remaining solvent is removed from solvent bottle 12. Timer 23 also controls the sequence of events during the purge cycle of solvent bottle 12. A time of 3 minutes was chosen to enable blower 22. Solvent bottle 12 when exposed to 3 minutes of air from blower 22 will yield less than 1 part per million of solvent to air when sensed by a Matheson gas detector. Having less than one part per million levels of solvent to air converts solvent bottle 12 from a hazardous waste material to a non-hazardous waste material. Solvent bottle 12 can now be disposed of in an inexpensive manner which is environmentally safe such as recycling. Puncturing solvent bottle 12 (if plastic) serves a secondary function of destroying solvent bottle 12, thus preventing reuse for storing other liquids. Piercing the bottom of solvent bottle 12 renders solvent bottle 12 non-useable as a liquid container.

A tube 24 which supplies compressed air passes through receptacle 16 and neck 25 of solvent bottle 12 into a main body of solvent bottle 12. Tube 24 also serves as a means for forcing gas through solvent bottle 12. Using compressed air to purge solvent bottle 12 of solvent is much more costly than activating blower 22 (more electricity is used) thus, compressed air is only used to purge glass solvent bottles. Also, if hollow piercing tool 19 was used to puncture a glass solvent bottle, the glass solvent bottle would shatter. Compressed air is forced through tube 24 and into solvent bottle 12. The compressed air forced into solvent bottle 12 vaporizes solvent liquid which adheres to solvent bottle 12 and is forced into receptacle 16 to be removed by line 17 or line 18. Timer 23 controls the length of time in which compressed air is forced through solvent bottle 12.

Tube 24 has a predetermined diameter. The predetermined diameter is critical to insure solvent is vaporized and removed from solvent bottle 12. The compressed air pressure, diameter of tube 24, and the remaining area within neck 25 of solvent bottle 12 to release air to receptacle 16 must be taken into account. In the preferred embodiment, compressed air is supplied at 4.922 kilograms per square centimeter. Tube 24 is chosen to have a diameter of 0.635 centimeters. Tube 24 will output 2.17 cubic meters per minute when receiving compressed air at 4.922 kilograms per square centimeter. This flow rate adequately vaporizes solvent within solvent bottle 12 and flows unrestricted from remaining area in neck 25 to be captured by receptacle 16 and removed by either line 17 or 18. The next larger sized standard tubing has a diameter of 0.9525 centimeters. A tube 0.9525 centimeters in diameter receiving air at 4.922 kilograms per square centimeter will output air at the rate of 4.90 cubic meters per minute. This flow rate is much higher than the 2.83 cubic meters per minute of blower 22. The increased tube diameter also reduces the remaining area in neck 25 restricting air flow out of solvent bottle 12. The increased air flow rate into solvent bottle 12 coupled with a further restriction at neck 25 does not flow adequately to receptacle 16 and thus is not used. Tube 24 should be centrally located within solvent bottle 12 for best performance. Timer 23 controls the purge cycle and runs compressed air through tube 24 for 3 minutes. Solvent bottle 12 after being purged for 3 minutes with compressed air will have less than 1 part per million of solvent to air when sensed by a Matheson gas detector. Solvent bottle 12 is not considered an environmental hazard with less than 1 part per million levels of solvent to air and is disposed of in an inexpensive and environmentally safe manner.

Solvents are generally highly flammable. To prevent a potentially dangerous fire, several precautionary measures are taken in the vapor reduction technique for a solvent bottle. To localize any fire which might develop, sealed enclosure 11 is either made of or lined with a fire resistant material. The fire resistant material which makes up sealed enclosure 11 or the fire resistant material which lines sealed enclosure 11 serves as a means for making sealed enclosure 11 fire retardant. Making sealed enclosure 11 fire resistant will increase the time in which a fire can safely be put out. A fire extinguishing system 31 is placed in sealed enclosure 11 and serves as a means for sensing and extinguishing fires. Drain line 17 has a stainless steel flame arrestor which prevents any flame from propagating down line 17. In the preferred embodiment, the means for extinguishing fires is a water sprinkler with a temperature sensor to enable the water sprinkler. An alternate system is a carbon dioxide spray system with an ultra violet radiation sensor for enabling the chemical spray when fire is present.

By now it should be appreciated that this invention provides a vapor reduction technique for a solvent bottle. Solvent bottle 12 is cleaned in a sealed enclosure 11. Human interaction in the purge cycle is limited to opening solvent bottle 12 and placing it in sealed enclosure 11. Vent 14 draws air and solvent vapors from sealed enclosure 11 to minimize exposure of solvent vapors to a human when placing solvent bottle 12 in sealed enclosure 11 and minimizing the release of solvent vapors to the atmosphere. Solvent bottle 12 rests in a cradle which has receptacle 16 formed in the cradle which encloses the opening of solvent bottle 12 to receive solvent liquid and vapor. Two different solvent purge cycles are used, one for a plastic solvent bottle and another for a glass solvent bottle. Solvent bottle type is automatically detected and enables the appropriate solvent purge cycle. Both solvent purge cycles use presurized air to vaporize any solvent liquid and force it from solvent bottle 12. Liquid solvent is removed to an environmentally safe storage tank and solvent vapor is run through vapor treatment equipment. Timer controls the purge cycle to insure accurate and repeatable results. Fire extinguishing system 31 is designed to extinguish a fire which might occur in sealed enclosure 11. After the solvent purge cycle, solvent bottle 12 is not classified as a hazardous material and can be disposed of in an appropriate manner. Solvent removed from solvent bottles can be disposed of in high volume containers which reduces cost and complexity of disposal. The vapor reduction technique allows a large quantity of solvent bottles to be processed in an inexpensive manner which conforms to the Clean Air Act of 1990.

I claim:

1. A vapor reduction system for making a used solvent bottle environmentally safe, the vapor reduction system comprising:
   a sealed enclosure for housing a solvent bottle having an access opening for evacuation, said sealed enclosure having a door for interior access, said sealed enclosure preventing escape of solvent vapor to the atmosphere;
   a cradle formed in said sealed enclosure for receiving and supporting a solvent bottle such that said access opening points towards a lower portion of said sealed enclosure thereby allowing the solvent liquid to drain from the bottle;
   a receptacle formed in said cradle for receiving solvent liquid and vapor from a solvent bottle;
   means for sensing a solvent bottle material when placed in said sealed enclosure, material being glass or plastic;
   means for vaporizing undrained liquid in a solvent bottle placed in said sealed enclosure, said means for vaporizing undrained liquid forcing vaporized liquid from the solvent bottle;
   a first line to remove solvent liquid from said receptacle, said first line having one end coupled to said receptacle and another end coupled to an environmentally safe container; and
   a second line to remove solvent vapor from said receptacle, said second line having one end coupled to said receptacle and another end coupled to a vapor recovery system.

2. A vapor reduction system as recited in claim 1 further including:
   a vent on said sealed enclosure for evacuating solvent gases, said vent being coupled to said vapor recovery system;
   said sealed enclosure being formed of a fire resistant material; and
   a fire extinguishing system placed within said sealed enclosure.

3. The vapor reduction system for solvent bottles of claim 1 further including:
   the solvent bottle having a neck, wherein the solvent bottle opening is at an end of the neck;
   the receptacle formed integral to the cradle, wherein the cradle holds the solvent bottle neck down and wherein the receptacle fits over the bottle neck.

4. A vapor reduction system as recited in claim 1 wherein said means for vaporizing liquid comprises:
   a hollow piercing tool coupled to said sealed enclosure for puncturing a solvent bottle composed of plastic; and
   a blower coupled to said hollow piercing tool for supplying air to evacuate solvent and solvent vapor from a solvent bottle.

5. A vapor reduction system as recited in claim 1 wherein said means for sensing comprises:
   an ultrasonic sensing device placed in said sealed enclosure for determining solvent bottle material.

6. A vapor reduction system as recited in claim 1 wherein said means for vaporizing comprises:
   a tube having a predetermined diameter for supplying compressed air to evacuate solvent and solvent vapor from a solvent bottle, said tube extending through said receptacle and an opening of a solvent bottle when supported by said cradle.

7. A vapor reduction system as recited in clam 1 further including:
   a timer coupled to said sealed enclosure, said timer enabling or disabling said means for vaporizing liquid.

8. A system for purging a solvent bottle of remaining fluid and vapor comprising:
   a sealed enclosure for housing a solvent bottle housing an access opening;
   means for supporting a solvent bottle formed within said sealed enclosure, said means for supporting supports a solvent bottle such that said access opening points towards lower portion said sealed enclosure thereby allowing the solvent liquid to drain from the bottle;
   means for vaporizing undrained liquid from a solvent bottle placed in said sealed enclosure; and
   means for recovering solvent vapor and liquid from said sealed enclosure means for treating said recovered solvent vapor from said sealed enclosure through a vapor treatment system and means for storing said recovered solvent liquid from said sealed enclosure in an environmentally safe container.

9. A system as recited in claim 8 wherein said sealed enclosure includes:
   a fire retardant material lining an interior of said sealed enclosure;
   means for venting solvent vapors from said sealed enclosure to said vapor treatment system; and
   means for extinguishing fire in said sealed enclosure.

10. A system as recited in claim 8 wherein said means for vaporizing liquid comprises;
   a hollow piercing tool coupled to said sealed enclosure;
   means for moving said hollow piercing tool to puncture a solvent bottle placed in said sealed enclosure; and
   a blower coupled to said hollow piercing tool to force air through said hollow piercing tool thereby evacuating solvent and solvent vapor from a solvent bottle placed in said sealed enclosure.

11. A system as recited in claim 8 wherein said means for vaporizing liquid comprises:

a tube of a predetermined diameter for sourcing compressed air coupled through said means for recovering, to evacuate solvent and solvent vapor from a solvent bottle placed in said sealed enclosure.

12. A system as recited in claim 8 wherein a cradle formed in said sealed enclosure for holding a solvent bottle serves as a means for supporting and wherein a receptacle to collect solvent liquid and solvent vapor formed in said cradle serves as a means for receiving, said receptacle having a first line having a first end coupled to said receptacle and a second end coupled to said environmentally safe container for removing solvent liquid and a second line having a first end coupled to said receptacle and a second end coupled to said vapor treatment system for evacuating solvent vapor.

* * * * *